D. MILLINGTON & C. MUNTHE.
CLAMPING MECHANISM FOR MULTIPLE SPINDLE LATHES.
APPLICATION FILED NOV. 22, 1910.
998,371. Patented July 18, 1911.
2 SHEETS—SHEET 1.
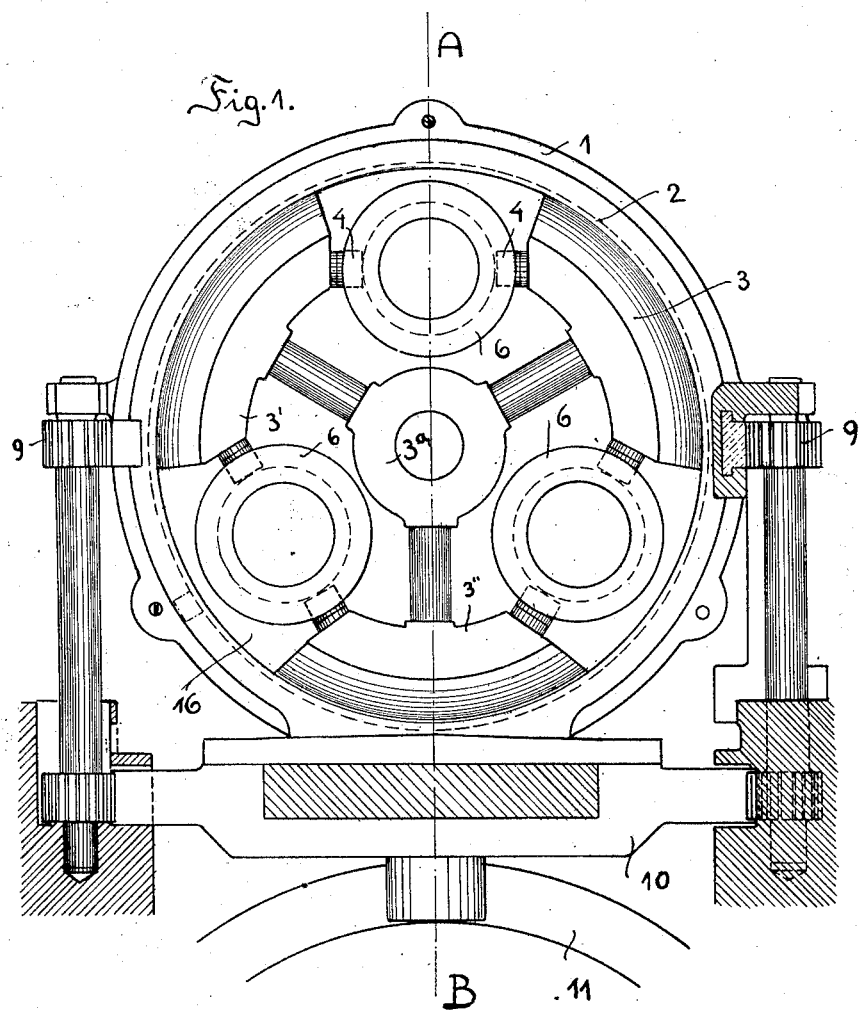

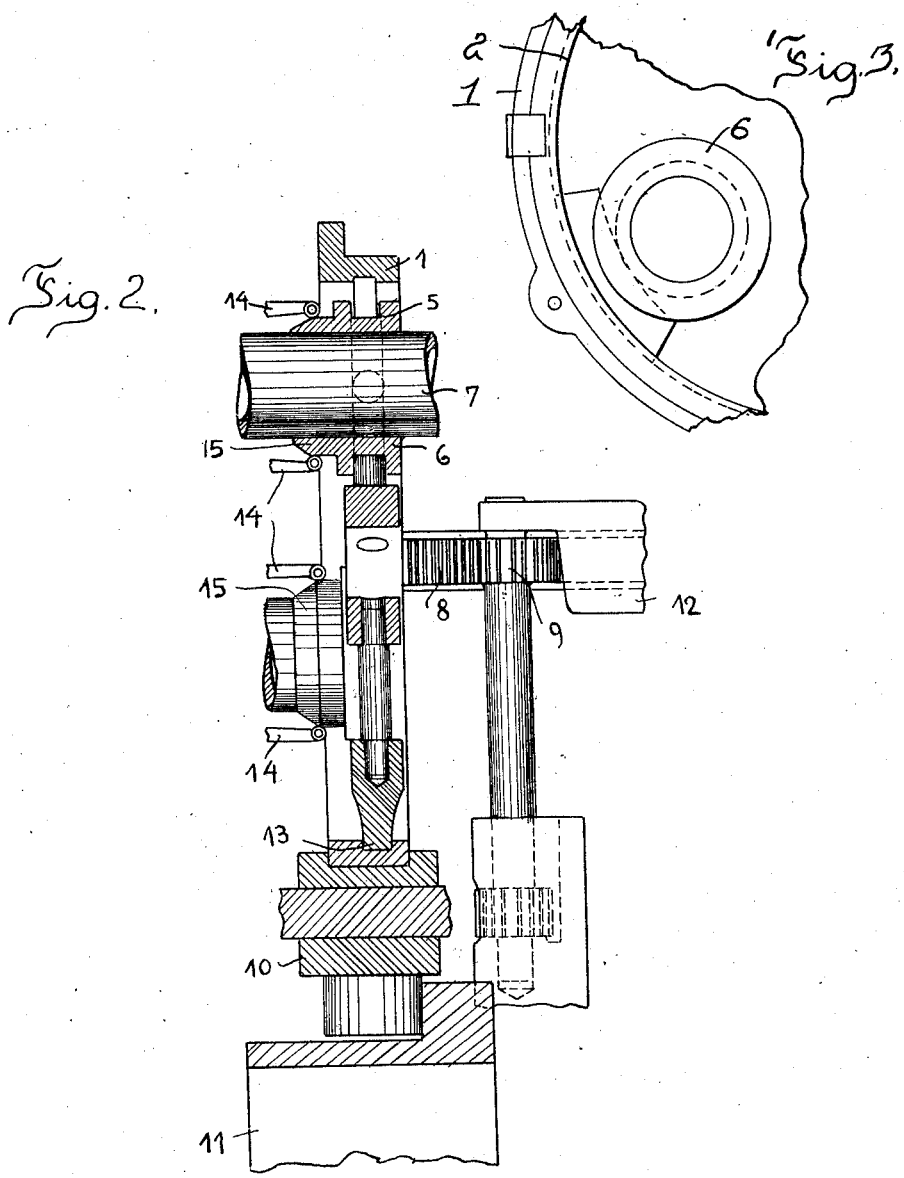

UNITED STATES PATENT OFFICE.

DAVID MILLINGTON AND CHRISTOFFER MUNTHE, OF FRIEDENAU, NEAR BERLIN, GERMANY.

CLAMPING MECHANISM FOR MULTIPLE-SPINDLE LATHES.

998,371. Specification of Letters Patent. Patented July 18, 1911.

Application filed November 22, 1910. Serial No. 593,729.

*To all whom it may concern:*

Be it known that we, DAVID MILLINGTON and CHRISTOFFER MUNTHE, a subject of the King of Norway and a subject of the King of Great Britain, respectively, and residents of Friedenau, near Berlin, Germany, have invented certain new and useful Improvements in Improved Clamping Mechanism for Multiple-Spindle Lathes, of which the following is a specification, and do hereby declare the nature of this invention and in what manner the same is to be performed to be particularly described and ascertained in and by the following statement.

This invention has for its object to produce an improved clamping mechanism for enabling a multiple-spindle lathe to be converted without constructional alteration into several single-spindle machines equal in number to the number of spindles in the multiple-spindle machine.

With this object in view, the device for moving the clamping collars of the spindles of the multiple-spindle machine forward and backward, are removably mounted in a frame that is moved parallelly to the spindles, so that either the clamping collars of all the spindles can be moved forward and backward at the same time, or when the spindles are being shifted around their common axis, only the clamping collar of that spindle that happens to be in a determined position will be moved forward and backward.

This invention affords the advantage that in machining a simple piece of work which can be finished in one position, a lathe provided with the improved clamping mechanism will be capable of producing at one time as many pieces of work as there are spindles in the machine.

One form of this invention is illustrated by way of example in the accompanying drawings in which:

Figure 1 is a front end elevation partly in section of the improved clamping mechanism applied to a three-spindle lathe, and Fig. 2 is a section on the line A—B of Fig. 1. Fig. 3 is a fragmental view of the clamping mechanism when the machine is used as an ordinary multiple-spindle lathe.

1 is the frame formed with an annular groove 2 in which ring segments 3, 3', 3'' engage that are supported and held in their positions by a center-piece 3ª. These ring segments are provided with rollers 4 that engage each in a groove 5 formed in the clamping collar 6 of its respective spindle 7.

The frame 1 is provided on each side with a rack 8 in which toothed wheels 9 engage that are driven by means of a crosspiece 10. This crosspiece 10 is moved to-and-fro by the action of a cam drum 11 driven from the main drive of the lathe.

As it may happen that the material in one spindle is used up sooner than in the other spindles, the frame 1 which is moved forward and backward parallelly to the spindles, would then be liable to tilt or crosswind if it were guided only on one side. With the object of avoiding this with certainty, the frame 1 has its lower end engaging in a recess 13 in the crosspiece 10, and is also held by means of the racks 8 which are arranged in side guides 12.

When it is desired to work the lathe as a number of single-spindle machines, the spindles remain stationary, that is they are not shifted around from one position into the other. The opening and closing of the chucks must then take place simultaneously in all the three spindles. This is effected by moving the frame 1 forward and backward by means of the toothed wheels 9. In this operation the ends of the clamping levers 14 move up on the clamping cones 15 during the forward movement, and the work is clamped thereby in the usual manner. In the backward movement of the frame the clamping cone 15 allows the levers 14 to move down again to release the work.

When it is desired to employ the machine as an ordinary multiple-spindle lathe, the parts 3, 3', 3'', and the center piece 3ª are taken out of the frame and a slide piece 16 (indicated in Fig. 3) is fixed instead in the annular groove 2 in the frame 1.

The three spindles which are mounted in the revolving head are shifted around in the usual manner, and in this movement the clamping collars of the several spindles come successively into engagement with the slide piece 16. By this means during the forward and backward movement of the frame 1, the clamping collar that happens to be in engagement with the slide piece 16, will also be moved forward and backward, so as to clamp or release the work accordingly. The clamping collars of the two other spindles remain meanwhile stationary, that is, they do not move forward and backward with the frame 1, so that there is no clamping or releasing of the work in those spindles.

It is to be understood that the lathe may have more than three spindles without departing from the nature of the invention.

Having now particularly described and ascertained the nature of our said invention and in what manner the same is to be performed we declare that what we claim is:—

1. A clamping mechanism for multiple-spindle lathes comprising the spindles, a frame carried by the lathe and surrounding the spindles, means for moving the frame parallelly to the spindles and removable means carried by the frame for actuating the clamping means of the spindles.

2. A clamping mechanism for multiple spindle lathes comprising the spindles, a frame carried by the lathe and surrounding the spindles, means for moving the same parallelly to the spindles, and interchangeable means on the frame for simultaneously or independently actuating the clamping means of the spindles.

3. A clamping mechanism for multiple spindle lathes comprising the spindles, a frame carried by the lathe, a movable cross piece guiding the lower end of the frame, means operated by the cross piece for moving the frame parallelly with the spindle and means carried by the frame for actuating the clamping means of the spindles.

4. A clamping mechanism for multiple spindle lathes comprising the spindles, a frame carried by the lathe, a movable cross piece guiding the lower end of the frame, racks on the sides of the frame, gears meshing with the racks and driven from the cross piece for moving the frame, and means carried by the frame for actuating the clamping means of the spindles.

5. A clamping mechanism for multiple spindle lathes comprising the spindles, a frame carried by the lathe having an annular groove therein, means for moving the frame parallelly with the spindles and clamping collars for the spindles removably mounted in said groove.

In testimony whereof, we affix our signatures in presence of two witnesses.

DAVID MILLINGTON.
CHRISTOFFER MUNTHE.

Witnesses:
WOLDEMAR HAUPT,
HENRY HASPER.

---

Copies of this patent may be obtained for five cents each, by addressing the "Commissioner of Patents, Washington, D. C."